US009923972B2

(12) United States Patent
Yasuma

(10) Patent No.: US 9,923,972 B2
(45) Date of Patent: Mar. 20, 2018

(54) CONTROL APPARATUS FOR CONTROLLING DATA TRANSMISSION VIA NETWORK, AND METHOD FOR SELECTING DATA DESTINATION

(71) Applicant: CANON KABUSHIKI KAISHA, Tokyo (JP)

(72) Inventor: Kensuke Yasuma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 780 days.

(21) Appl. No.: 14/288,533

(22) Filed: May 28, 2014

(65) Prior Publication Data
US 2014/0372587 A1 Dec. 18, 2014

(30) Foreign Application Priority Data

Jun. 14, 2013 (JP) .................................. 2013-126127

(51) Int. Cl.
*H04L 29/08* (2006.01)
(52) U.S. Cl.
CPC .................................. *H04L 67/12* (2013.01)
(58) Field of Classification Search
CPC ....... H04L 67/12; H04L 67/02; H04L 67/104; H04L 67/1074; H04L 67/22; H04N 2201/001; H04W 4/008; H04W 4/003
See application file for complete search history.

(56) References Cited

U.S. PATENT DOCUMENTS

| 8,533,611 B2* | 9/2013 | Katis | H04L 12/1827 |
| | | | 370/352 |
| 2005/0080559 A1* | 4/2005 | Ishibashi | E02F 9/2045 |
| | | | 701/50 |
| 2005/0172024 A1* | 8/2005 | Cheifot | H04L 29/12009 |
| | | | 709/225 |
| 2008/0052384 A1* | 2/2008 | Marl | H04L 12/2807 |
| | | | 709/223 |
| 2011/0159916 A1* | 6/2011 | Boskovic | H04L 67/2823 |
| | | | 455/556.1 |
| 2012/0150995 A1 | 6/2012 | Kunimatsu | |
| 2013/0077127 A1* | 3/2013 | Bhatia | H04N 1/00233 |
| | | | 358/1.15 |
| 2014/0169561 A1* | 6/2014 | Schmit | H04W 12/04 |
| | | | 380/270 |

FOREIGN PATENT DOCUMENTS

| JP | 2006-157672 A | 6/2006 |
| JP | 2007-058832 A | 3/2007 |

* cited by examiner

*Primary Examiner* — Sargon Nano
(74) *Attorney, Agent, or Firm* — Fitzpatrick, Cella, Harper & Scinto

(57) ABSTRACT

A control apparatus for controlling data transmission via a network, comprising: a reception unit configured to receive, via the network, a result of detection by a sensor for detecting a state of a device; a management unit configured to manage results of detection by a plurality of sensors for detecting states of a plurality of devices corresponding to a common identification; and a selection unit configured to select, from the plurality of devices, a device which is a destination of data whose destination is the identification, based on the results of detection managed by the management unit.

17 Claims, 12 Drawing Sheets

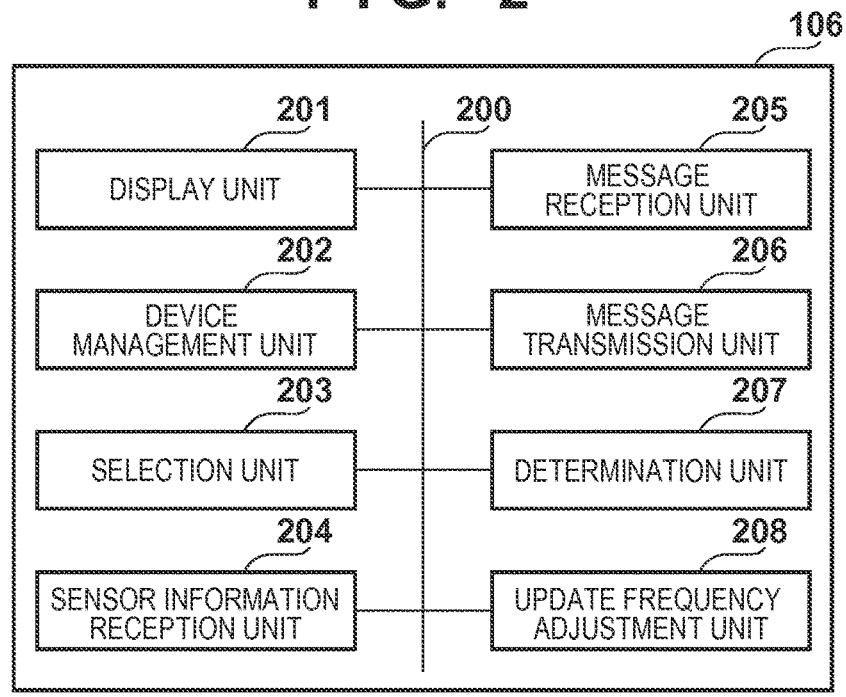
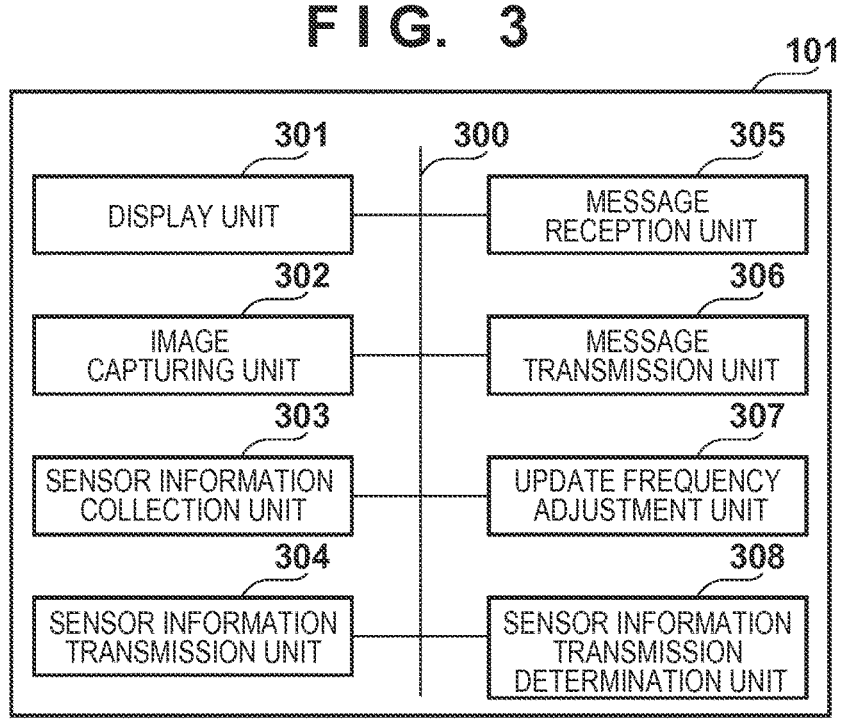

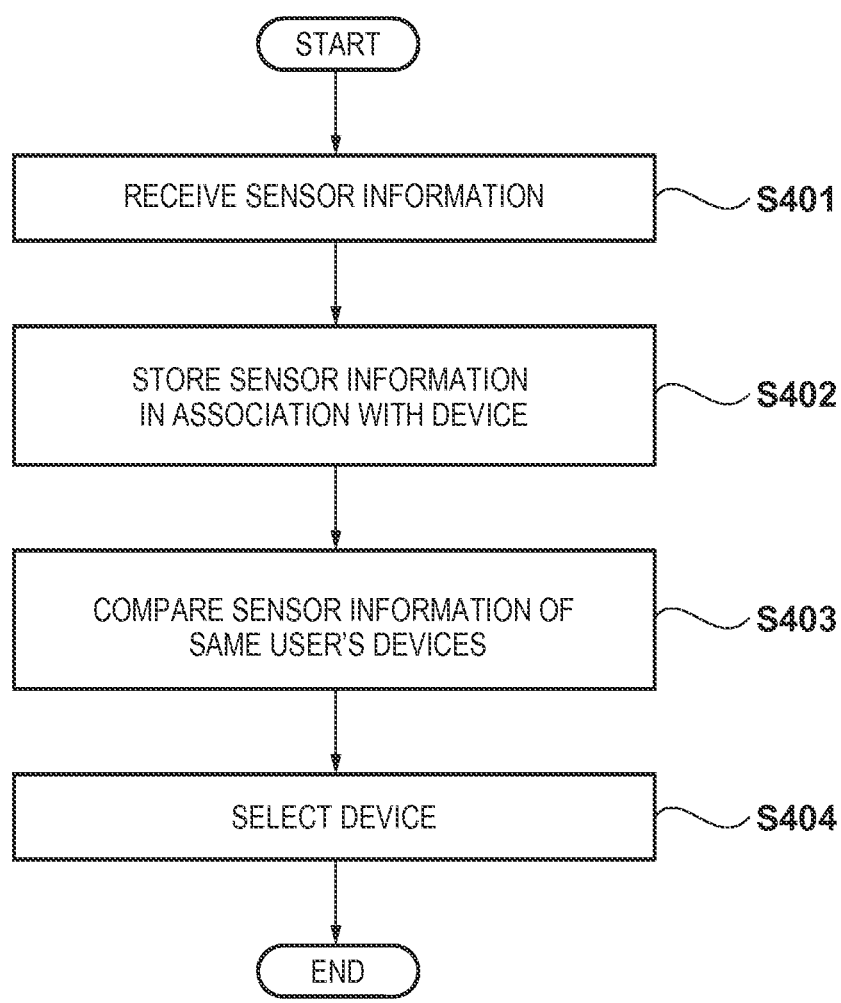

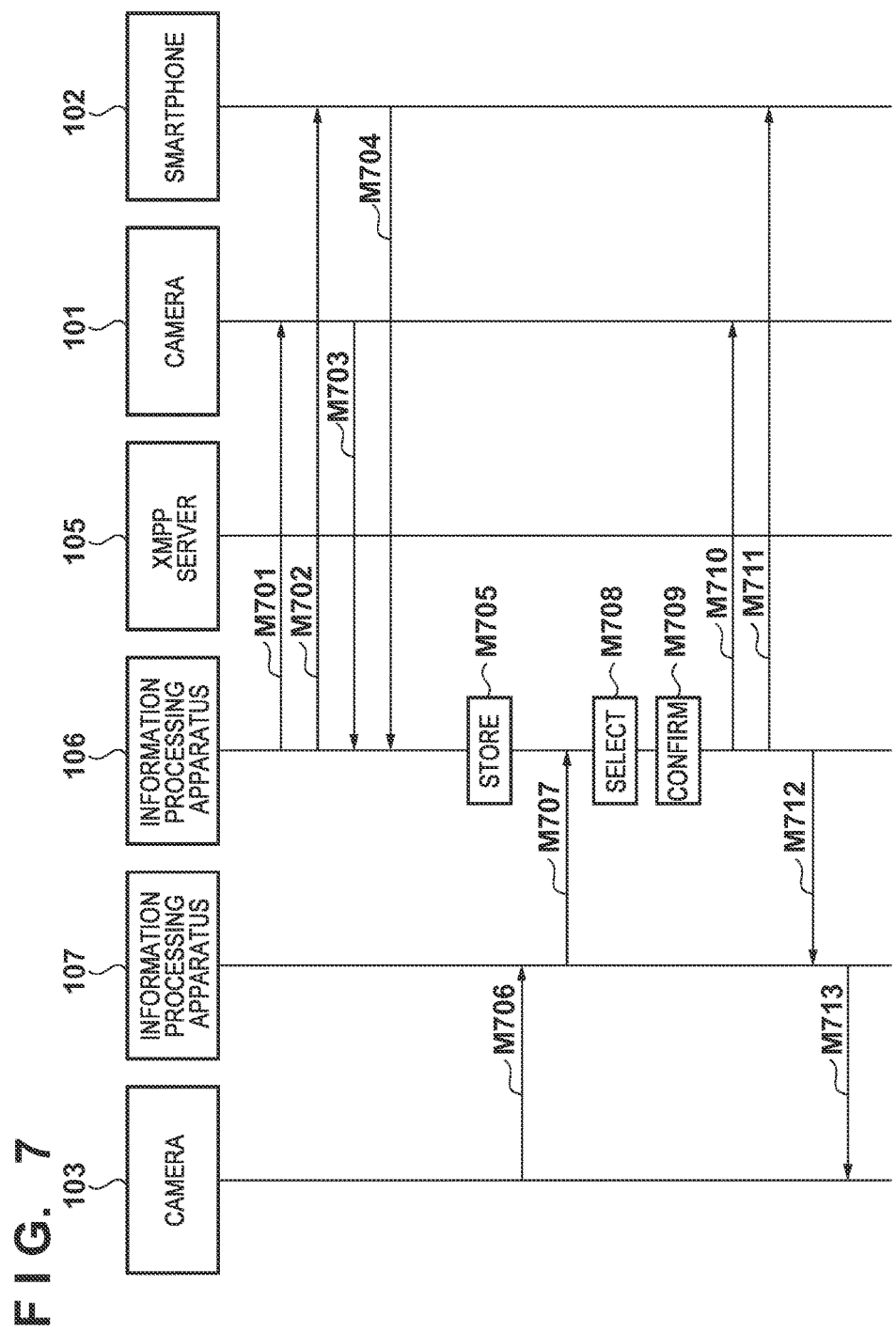

FIG. 9

| NAME OF DEVICE | XMPP JID | PRIORITY |
|---|---|---|
| CAMERA 101 | kensuke@xxx.co.jp/camera | -1 |
| SMARTPHONE 102 | kensuke@xxx.co.jp/smartphone | -1 |
| INFORMATION PROCESSING APPARATUS 106 | kensuke@xxx.co.jp/virtual | 0 |
| CAMERA 103 | naoki@yyy.co.jp/camera | -1 |
| PRINTER 104 | naoki@yyy.co.jp/printer | -1 |
| INFORMATION PROCESSING APPARATUS 107 | naoki@yyy.co.jp/virtual | 0 |

FIG. 10

1001
to(hop-by-hop): naoki@yyy.co.jp/virtual
from(hop-by-hop): naoki@yyy.co.jp/camera
to(inner-header): kensuke@xxx.co.jp
from(inner-header): naoki@yyy.co.jp/camera 1002
to(hop-by-hop): kensuke@xxx.co.jp/virtual
from(hop-by-hop): naoki@yyy.co.jp/virtual
to(inner-header): kensuke@xxx.co.jp
from(inner-header): naoki@yyy.co.jp/camera 1003
to(hop-by-hop): kensuke@xxx.co.jp/camera
from(hop-by-hop): kensuke@xxx.co.jp/virtual
to(inner-header): kensuke@xxx.co.jp
from(inner-header): naoki@yyy.co.jp/camera 1004
to(hop-by-hop): kensuke@xxx.co.jp/virtual
from(hop-by-hop): kensuke@xxx.co.jp/camera
to(inner-header): naoki@yyy.co.jp/camera
from(inner-header): kensuke@xxx.co.jp/camera 1005
to(hop-by-hop): naoki@yyy.co.jp/virtual
from(hop-by-hop): kensuke@xxx.co.jp/virtual
to(inner-header): naoki@yyy.co.jp/camera
from(inner-header): kensuke@xxx.co.jp/camera 1006
to(hop-by-hop): naoki@yyy.co.jp/camera
from(hop-by-hop): naoki@yyy.co.jp/virtual
to(inner-header): naoki@yyy.co.jp/camera
from(inner-header): kensuke@xxx.co.jp/camera

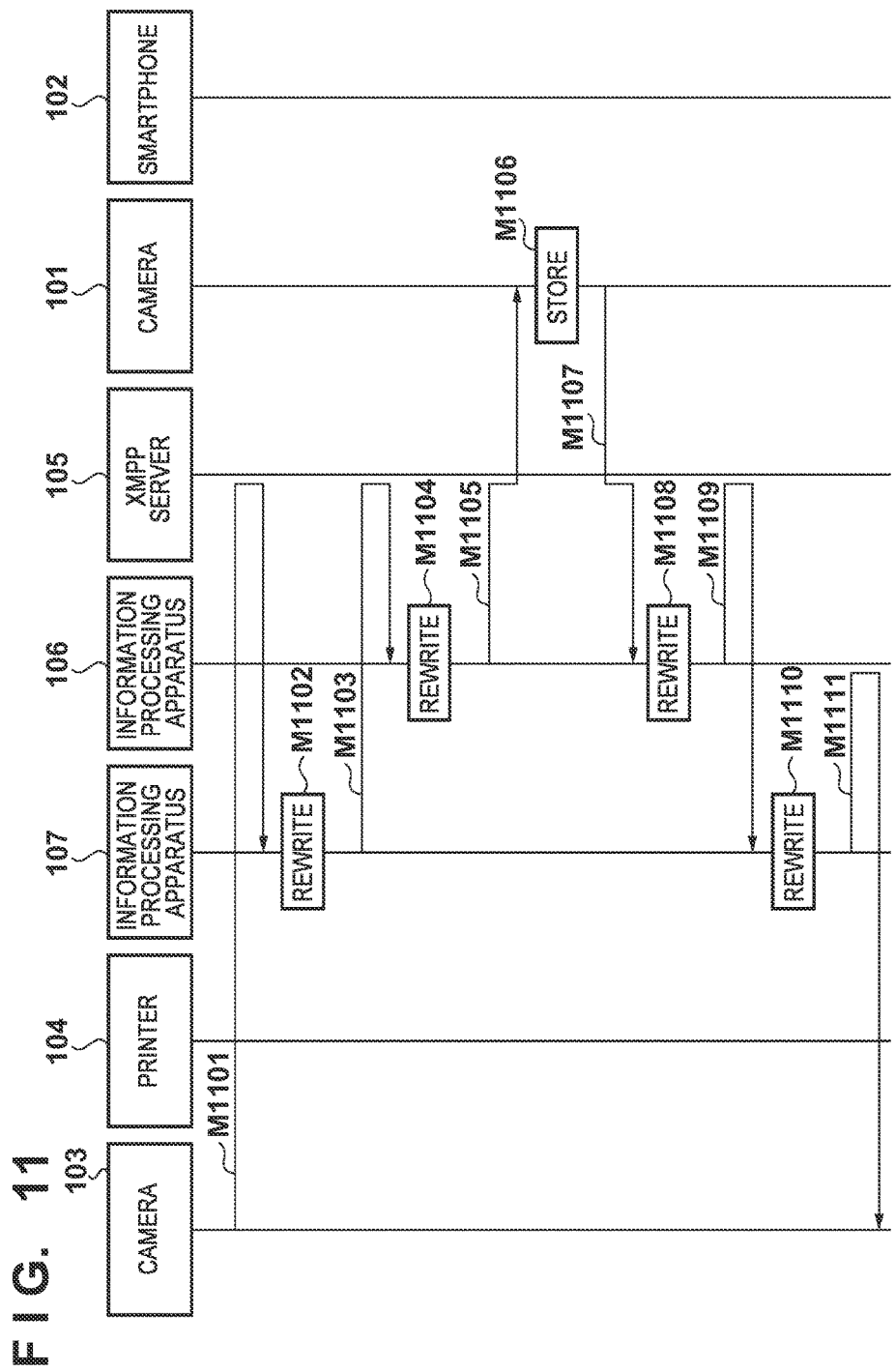

CONTROL APPARATUS FOR CONTROLLING DATA TRANSMISSION VIA NETWORK, AND METHOD FOR SELECTING DATA DESTINATION

BACKGROUND OF THE INVENTION

Field of the Invention

The present invention relates to control apparatuses for controlling data transmission via a network, and methods for selecting a destination of data.

Description of the Related Art

The reduction in size of devices and the widespread use of wireless LAN have allowed for connection of portable devices to a network. An increasing number of users have had multiple such devices and used different devices for different situations. Here, a smartphone and a single-reflex camera will be discussed as an example. A user who has these two devices may use the smartphone to utilize a high-performance application, and the single-reflex camera to take a photograph.

Incidentally, as a technique of distributing a message to various devices, there is a known distributed process performed in a P-to-P (P2P) system. The technique is used to transfer a message to a device having the lowest processing load.

If the load distributed process technique is applied to an environment in which a user uses multiple devices, a message may not be delivered to a device intended by the user. Even when the user wishes to transmit a message to a device which the user actually uses, the message may be transmitted to another device having a lower processing load which is not intended by the user.

A user (caller) needs to notify another user on the other end (callee) of a network environment (e.g., an IP address, a port number, etc.) in which the caller is currently using a device, and cannot directly transmit a message to a device which the callee is currently using.

Japanese Patent Laid-Open No. 2006-157672 discloses a technique of finding a state of a mobile apparatus before transmitting a signal, to determine whether to transmit a signal to the mobile apparatus based on a state of the mobile apparatus.

However, even when the technique of Japanese Patent Laid-Open No. 2006-157672 is applied to a case where a user has multiple devices, each device is independently checked based on a state of the device to only make a decision as to whether to transmit a signal to the device. It is not possible to select a suitable one from the multiple devices possessed by the user.

As a result, unless a user who has multiple devices notifies of a network environment of a predetermined device before using the device, the user cannot perform communication, resulting in a decrease in usability.

The present invention provides a technique of delivering a message to a device intended by a user.

SUMMARY OF THE INVENTION

According to one aspect of the present invention, there is provided a control apparatus for controlling data transmission via a network, comprising: a reception unit configured to receive, via the network, a result of detection by a sensor for detecting a state of a device; a management unit configured to manage results of detection by a plurality of sensors for detecting states of a plurality of devices corresponding to a common identification; and a selection unit configured to select, from the plurality of devices, a device which is a destination of data whose destination is the identification, based on the results of detection managed by the management unit.

Further features of the present invention will become apparent from the following description of exemplary embodiments with reference to the attached drawings.

BRIEF DESCRIPTION OF THE DRAWINGS

FIG. 2 is a diagram showing a module configuration of an information processing apparatus 106 according to an embodiment of the present invention.

FIG. 3 is a diagram showing a module configuration of a camera 101 according to an embodiment of the present invention.

FIG. 4 is a flowchart showing steps of a process which is performed by the information processing apparatus 106 of the embodiment of the present invention when it receives sensor information.

FIG. 7 is a sequence diagram of an information processing system according to an embodiment of the present invention.

FIG. 9 is a diagram showing correspondence between devices according to an embodiment of the present invention and XMPP addresses.

FIG. 10 is a diagram showing changes of destinations which occur when a message directed to a user A is transmitted from the camera 103 of the embodiment of the present invention.

FIG. 11 is a sequence diagram showing a case where a user B transmits contents from the camera 103 to another user A, according to an embodiment of the present invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
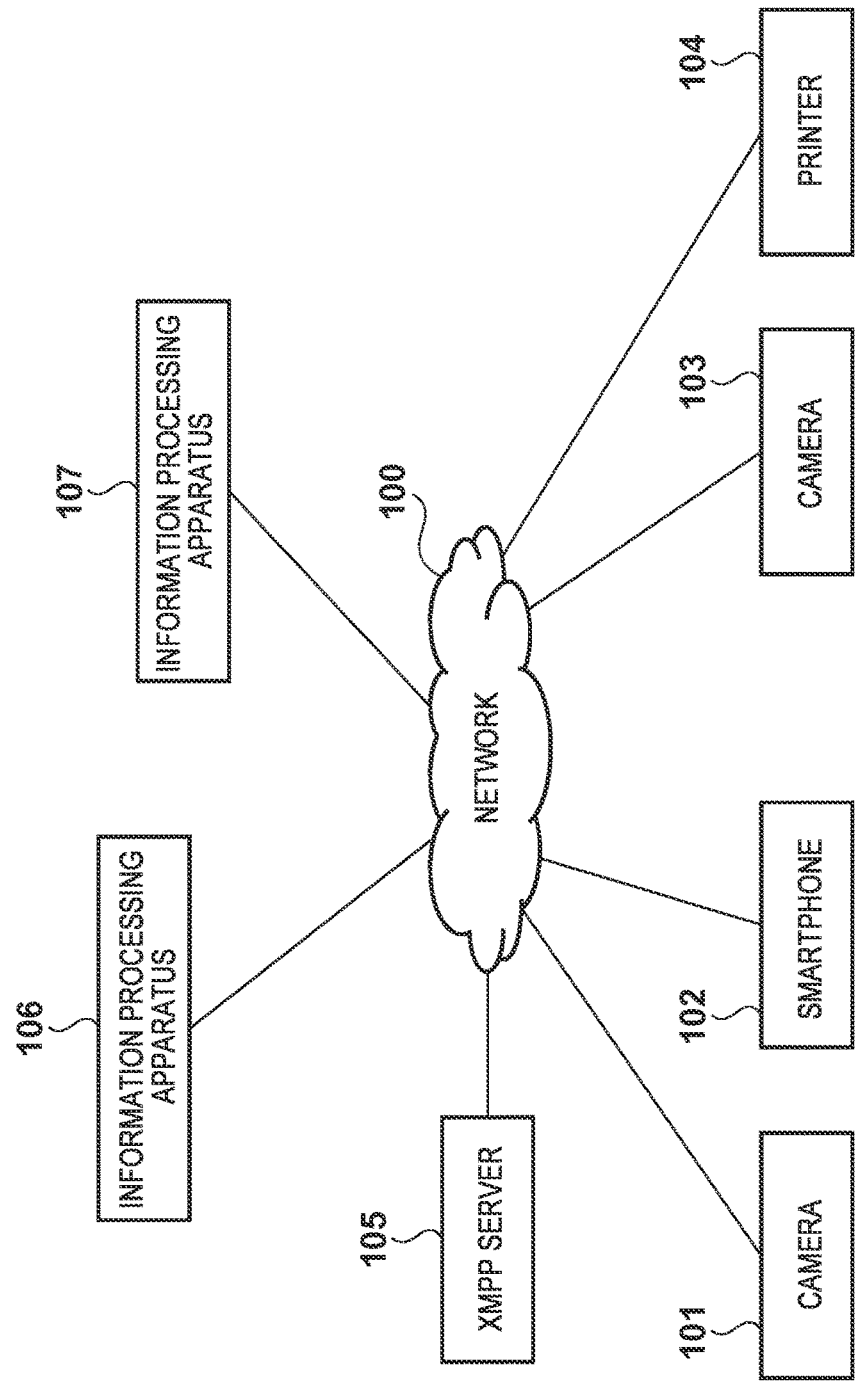
FIG. 1 is a diagram showing an example configuration of an information processing system according to an embodiment of the present invention.

FIG. 1 is a diagram showing an example configuration of an information processing system according to an embodiment of the present invention. A reference character 100 indicates a network. The network 100 of this embodiment may be implemented by a combination of the Internet, a wide area network (WAN), a local area network (LAN), etc.

A reference character 101 indicates a user A's camera. The camera 101 transmits sensor information to an information processing apparatus 106 via an Extensive Message and Presence Protocol (XMPP) server 105. A reference character 102 indicates the user A's smartphone. The smartphone 102 transmits sensor information to the information processing apparatus 106 via the XMPP server 105. A reference character 103 indicates a user B's camera. The camera 103 transmits sensor information to an information processing apparatus 107 via the XMPP server 105.

A reference character 104 indicates the user B's printer. The printer 104 transmits sensor information to the information processing apparatus 107 via the XMPP server 105. A reference character 105 indicates an XMPP server which has a server function conforming to Extensive Message and Presence Protocol (XMPP). The XMPP server 105 accepts connection from the camera 101, the smartphone 102, the camera 103, the printer 104, the information processing apparatus 106, and the information processing apparatus 107, and exchanges a message therewith. In this embodiment, the XMPP server 105 manages "xxx.co.jp" (the user A's domain) and "yyy.co.jp" (the user B's domain).

A reference character 106 indicates the user A's information processing apparatus. The information processing apparatus 106 manages a relationship between the user A and the user A's devices, and the sensor information of the user A's devices (the camera 101, the smartphone 102). The information processing apparatus 106 also receives a message directed to the user A, the camera 101, or the smartphone 102, and selects a destination based on the matter of the message or the sensor information of a device, and transmits the message to the destination.

A reference character 107 is the user B's information processing apparatus. The information processing apparatus 107 manages a relationship between the user B and the user B's devices, and the sensor information of the user B's devices (the camera 103, the printer 104). The information processing apparatus 107 also receives a message to the user B, the camera 103, or the printer 104, and selects a destination based on the matter of the message or the sensor information of a device, and transmits the message to the destination. A single information processing apparatus may serve as both of the information processing apparatuses 106 and 107.

FIG. 2 is a diagram showing a module configuration of the information processing apparatus 106 of the embodiment of the present invention. The information processing apparatus 107 has a similar configuration. A reference character 200 indicates a bus which connects modules together. A reference character 201 indicates a display unit which displays an image and various graphical user interfaces (GUIs).

A reference character 202 indicates a device management unit which manages the sensor information of the camera 101 and the smartphone 102 possessed by the user A while associating the user A with the camera 101 and the smartphone 102. The device management unit 202 stores and manages the history of the sensor information of the camera 101 and the smartphone 102 in a database. The database is provided in the device management unit 202, or in the information processing apparatus 106 excluding the device management unit 202, or an apparatus (not shown) on the network 100 other than the information processing apparatus 106. The device management unit 202 manages the user A, the user A's destination address (XMPP JID), and the camera 101's and the smartphone 102's destination addresses (XMPP JID). These pieces of destination information may be previously set, or input from the camera 101 and/or the smartphone 102.

A reference character 203 indicates a selection unit which selects a device as a transmission destination based on the sensor information of the camera 101 and the smartphone 102.

A reference character 204 indicates a sensor information reception unit which receives sensor information from the camera 101 and the smartphone 102. Although, in this embodiment, sensor information is received directly from the camera 101 and the smartphone 102, the present invention is not limited to this. Alternatively, sensor information may be received from the camera 101 and the smartphone 102 via a personal computer (PC) etc. Sensor information refers to information detected by a touch sensor, optical sensor, pressure sensor, gyroscope, angle sensor, GPS, image sensor, sound sensor, magnetometer, or soft sensor, or a combination thereof.

Sensor information may be information obtained using a physical or soft (virtual) sensor other than those described above. The sensor information of the camera 101 and the smartphone 102 may be received from a sensor device provided around the camera 101 and the smartphone 102. Examples of such a sensor device include an object recognition sensor, motion sensor, image sensor (e.g., a monitoring camera etc.), etc. Although, here, sensors for objects and humans are mentioned, the present invention is not limited to this. Other sensors, such as an audio sensor etc., may be employed.

A reference character 205 indicates a message reception unit which receives a message from a user or a device. A reference character 206 indicates a message transmission unit which transmits a message to a user or a device. A reference character 207 indicates a determination unit which determines the matter of a message received by the message reception unit 205. The determination unit 207 determines whether a message is, for example, a broadcast message or notification or an operation. It may be determined whether or not a message is an operation, based on a message command (e.g., printing, copying, image obtaining, etc.). Although, in this embodiment, it is determined whether the matter of a message is a broadcast message or notification or an operation, the present invention is not limited to this.

A reference character 208 indicates an update frequency adjustment unit which adjusts the frequency at which sensor information is updated. The update frequency adjustment unit 208 calculates the update frequency based on the amount of sensor information from the camera 101 and the smartphone 102, the processing load of the camera 101 and the smartphone 102, and the processing load of the information processing apparatus 106. For example, it is assumed that the throughput (processing rate) of the information processing apparatus 106 is x (bps), the throughput of a device (the camera 101 or the smartphone 102) is y (bps), the bandwidth of the network is b (bps), and the data amount of sensor information is d (bps). At this time, the maximum interval of the update frequency may be represented by $e=\min\{b, d\}/\min\{x, y\}$. That is, the maximum interval is defined as (the smaller of the bandwidth and the data amount of sensor information)/(the smaller of the throughput of the information processing apparatus 106 and the throughput of a device). Although, in this embodiment, the above expression is used, the present invention is not limited to this. A fixed processing time, a delay or fluctuation in the network, a bandwidth-delay product, a memory capacity of a window size of data transmission and reception, etc. may be employed. The update frequency may be calculated using at least one of these items of information.

The information processing apparatus 107 has a configuration similar to that of the information processing apparatus 106.

Although, in this embodiment, the information processing apparatuses 106 and 107 are separated from each other, the present invention is not limited to this. Alternatively, the information processing apparatuses 106 and 107 may be provided in the same apparatus. Alternatively, the information processing apparatuses 106 and 107 may be provided along with other information processing apparatuses in a server or a cloud in a distributed fashion.

FIG. 3 is a diagram showing a module configuration of the camera 101 of the embodiment of the present invention. The smartphone 102 and the camera 103 have a configuration similar to that of the camera 101. For the printer 104, a print function is added to this configuration. Although, in this embodiment, a camera, a smartphone, and a printer are provided as an example, the present invention is not limited to this. Other devices (e.g., a tablet, a viewer, and a scanner) may be employed.

A reference character 300 indicates a bus which connects modules together. A reference character 301 indicates a display unit which displays an image and various graphical user interfaces (GUIs). A reference character 302 indicates an image capturing unit which captures an image.

A reference character 303 indicates a sensor information collection unit which collects sensor information, such as a change in surroundings of the camera 101, a status of use by a user, a status of an application, etc. In addition to information inside the camera 101, an external sensor(s) around the camera 101 may be found, and sensor information may be obtained from the external sensor. Examples of such an external sensor include an external temperature sensor, humidity sensor, monitoring camera, etc.

A reference character 304 indicates a sensor information transmission unit which transmits sensor information collected by the sensor information collection unit 303 to the information processing apparatus 106. In this embodiment, the sensor information transmission unit 304 transmits sensor information to the information processing apparatus 106 via the XMPP server 105 using XMPP. The present invention is not limited to this. Sensor information may be transmitted to the information processing apparatus 106 using a web service, such as Representational State Transfer (REST) or Simple Object Access Protocol (SOAP).

A reference character 305 indicates a message reception unit which receives a message. A reference character 306 indicates a message transmission unit which transmits a message to a user or a device as a destination. A reference character 307 indicates an update frequency changing unit which changes the update frequency at which sensor information is transmitted to the information processing apparatus 106. A reference character 308 indicates a sensor information determination unit which determines whether to transmit sensor information to the information processing apparatus 106.

FIG. 4 is a flowchart showing steps of a process which is performed by the information processing apparatus 106 of the embodiment of the present invention when it receives sensor information.

In step S401, the sensor information reception unit 204 receives sensor information from the camera 101 and the smartphone 102, and control proceeds to step S402. In step S402, the device management unit 202 stores the received sensor information in association with the respective corresponding devices, and control proceeds to step S403. In step S403, the selection unit 203 compares the sensor information of devices (the user A's devices) managed by the device management unit 202, and control proceeds to step S404.

In step S404, based on the result of the comparison, the selection unit 203 selects a device to which priority should be given. For example, when the illuminance sensor and the gyroscope indicate a numerical value greater than or equal to a predetermined value, it may be determined that the device is being used out of a pocket (bag). Here, the device which is being used is selected. Based on the result of the selection in step S404, displaying indicated by a reference character 812 in FIG. 8B described below is performed. Similarly, displaying indicated by a reference character 811 for a friend is performed (FIG. 8B is described in detail below).

Although, in this embodiment, the illuminance sensor and the gyroscope are described as an example, the present invention is not limited to this. For example, the selection unit 203 may obtain the frequency of use or the date and time of use from sensor information, and select a device based on these pieces of information. More specifically, a device having a higher frequency of use by the user or a more recent date and time of use by the user may be selected. Alternatively, it may be determined that a device is being used, based on the time of most recent touch on the screen detected by a touch sensor, the result of analysis of the magnitude of ambient sound by a sound sensor, a motion of a device detected by an angle sensor, etc. Alternatively, the CPU power of a device, the remaining capacity of a memory, the bandwidth of the network, the type (Wi-Fi, 3G, LTE, etc.) of the network to which a device is connected, a magnetometer, etc. may be used, or the log of use of an application may be used. By combining these pieces of information, the accuracy of determination of device selection may be improved.

Figure 5:
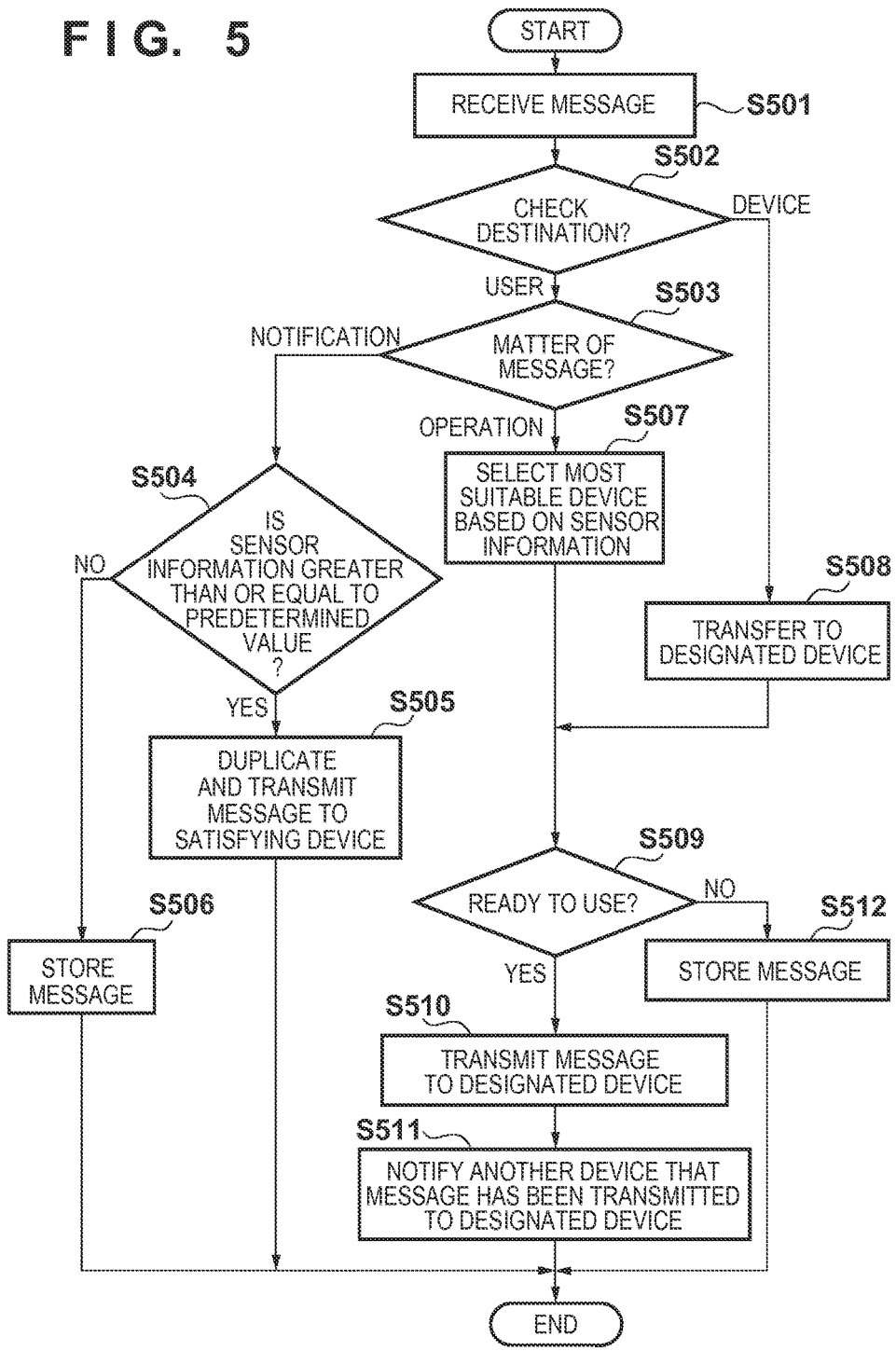
FIG. 5 is a flowchart showing steps of a process which is performed by the information processing apparatus 106 of the embodiment of the present invention when it receives a message.

FIG. 5 is a flowchart showing steps of a process which is performed by the information processing apparatus 106 of the embodiment of the present invention when it receives a message.

In step S501, the message reception unit 205 receives a message from the information processing apparatus 107, and control proceeds to step S502. In step S502, the determination unit 207 determines whether the message is directed to the user A or a device (the camera 101 or the smartphone 102). If the message is directed to the user A, control proceeds to step S503. On the other hand, if the message is directed to a device, control proceeds to step S508.

Assuming that XMPP is used, the format of a destination address (a user's address or a device's address) will be described. When "kensuke@xxx.co.jp" (Bare JID) is contained in a destination, a message is directed to the user A. When the destination address is "kensuke@xxx.co.jp/camera" (Full JID), a message is directed to the camera 101. When a destination address is "kensuke@xxx.co.jp/smartphone" (Full JID), a message is directed to the smartphone 102. A device's destination address is represented by a concatenation of Bare JID (user name) with resource information (device name). Note that the information processing apparatus 106 is indicated by "kensuke@xxx.co.jp/virtual".

The priority levels of the information processing apparatus 106, the camera 101, and the smartphone 102 are set so that the information processing apparatus 106 has the highest priority level. As a result, when a message directed to "kensuke@xxx.co.jp" is received, the message is transmitted to the information processing apparatus 106.

Although, in this embodiment, the XMPP format is used and therefore the above design is employed, the present invention is not limited to this. Alternatively, a session directed to a user may be separately created. For example, a session "kensuke@xxx.co.jp/user" is generated from the information processing apparatus 106, and a message directed to a user is sent to "kensuke@xxx.co.jp/user". As a result, a message directed to a user is always delivered to the information processing apparatus 106. Alternatively, all messages directed to the user A may be exchanged via the information processing apparatus 106 using an application programming interface (API), such as SOAP, REST, etc.

Similarly, a message directed to the user B is processed by the information processing apparatus 107.

FIG. 9 shows a table indicating correspondence between devices and XMPP addresses. The camera 101, the smartphone 102, the camera 103, and the printer 104 have a priority level of −1. The information processing apparatuses 106 and 107 have a priority level of 0. Because the information processing apparatus 106 has the highest priority level of the user A's apparatuses, the XMPP server 105 can transmit a message directed to the user (e.g., to "kensuke@xxx.co.jp") to the information processing apparatus 106. The same applies to the information processing apparatus 107.

Because the camera 101, the smartphone 102, the camera 103, and the printer 104 have a priority level of −1, a message is not copied in the XMPP server 105. As a result, each device does not receive a message directed to another device. As a result, it is no longer necessary to receive an unnecessary message, resulting in the effect of reducing the processing load of a device.

In step S503, the determination unit 207 determines whether a command contained in a message is a notification or an operation. The term "notification" refers to an asynchronous message, such as an event, NOTIFY, ACK, a broadcast message, etc. The term "operation" refers to a synchronous command which requires a response, such as a remote procedure call (RPC) etc. Examples of an operation include copying or moving of a content, a remote operation of a camera viewfinder, etc. If it is determined that a command contained in a message is a notification, control proceeds to step S504. On the other hand, if it is determined that a command contained in a message is an operation, control proceeds to step S509.

In step S504, the selection unit 203 obtains the sensor information of a corresponding device(s) from the device management unit 202, and determines whether or not the sensor information is greater than or equal to a predetermined value. If it is determined that there are multiple devices whose sensor information is greater than or equal to the predetermined value, the multiple devices are selected, and control proceeds to step S505. Although, in this embodiment, multiple devices are selected, the present invention is not limited to this. Alternatively, a single device may be selected.

On the other hand, if it is determined that there is no device whose sensor information is greater than or equal to the predetermined value, control proceeds to step S506. For example, if both the illuminance sensor and the gyroscope have sensor information which is greater than or equal to the predetermined value, it is determined that the user is using the device (taking the device out of a pocket and holding the device with a hand). For example, when the user A is using the camera 101 held with their right hand and the smartphone 102 held with their left hand, a message is delivered to both of the devices.

In step S505, the message transmission unit 206 duplicates a message for devices selected by the selection unit 203, and thereafter, transmits the message to all the selected devices, and the process is ended. Although, in this embodiment, a message is duplicated and transmitted, if a protocol other than XMPP is employed and the protocol can support multiple destinations, a message may be transmitted to multiple destinations.

In step S506, there is no device selected by the selection unit 203, and therefore, the message transmission unit 206 stores a message until the state of a device has changed, and the process is ended. As described below with reference to FIG. 6, if there is a stored message when the state of a device has changed (the sensor information of a device has become greater than or equal to the predetermined value), the message transmission unit 206 transmits the stored message to the device whose state has changed. Although, in this embodiment, a period of time during which a message is stored is not specified, the message storage period may be, for example, set to one hour etc. A message may contain an expiration time and may be stored only until the expiration time. A message may be stored in a memory of the message transmission unit 206, or a memory of the information processing apparatus 106, or a memory of an apparatus on the network 100.

In step S507, the selection unit 203 selects a most suitable device based on sensor information. For example, if an image is to be displayed, a device which is being used by the user A (here, the camera 101) is selected based on the sensor information of the user A's devices (the camera 101 and the smartphone 102). In this embodiment, the selection is performed by a method similar to that of step S404. If there is no difference from the sensor information obtained in step S404 or if a difference from the sensor information obtained in step S404 is smaller than a predetermined value, and therefore, it is predicted that the same calculation result will be obtained, the selection of step S507 may be skipped. When the selection of step S507 is skipped, the device selected in step S404 is used. As a result, the number of steps in the process can be reduced. Although, in this embodiment, a process similar to step S404 is performed, the present invention is not limited to this. Alternatively, a specific algorithm may be changed, depending on individual operations (printing or copying).

A case where printing is performed will now be described. For example, when the user A has the camera 101 and a printer, the user A selects the printer because the camera 101 does not print. A message is transmitted to the printer. A message notifying that the printer has been operated (printing) may be transmitted to the camera 101. As a result, selection can be caused to be closer to the user's intention, resulting in an improvement in convenience.

An example in which processes for the sensor information of a device are changed, depending on the operation indicated by a message, will also be described. For example, if the operation is printing, a device for which there is no job and which is located near the user may be selected. Processing algorithms for the sensor information of a device can be changed, depending on the operation indicated by a message, and therefore, various situations can be dealt with, resulting in an improvement in versatility and usability of the system.

When there are successive messages, the same device may be selected for a predetermined group of processes in order to prevent a group of successive messages from being delivered to another device. In this case, an identifier indicating that there are successive processes is given to a message, and the determination unit 207 stores association of the identifier with the selected device. As a result, a selected device can be searched for using an identifier, and therefore, the same device can be selected. This process may be applied to selection in step S504 in addition to step S507. The above process allows for selection of the same device and transmission of messages to that device in a series of processes.

In step S508, the message transmission unit 206 determines to transmit a message to a designated device, and control proceeds to step S509.

In step S509, based on the sensor information of the determined device, the selection unit 203 determines whether or not the device is currently ready to use. If the result of the determination is positive, control proceeds to step S510. Otherwise, control proceeds to step S511. For example, it may be determined that, although the user is currently using the determined device, the determined device is not ready to use, because of another situation or condition, such as that congestion occurs in wireless communication, that the intensity of radio waves is low, that shooting is currently being performed using the camera, etc. Although, in this embodiment, the selection of a device and the checking of whether or not the device is ready to use are separately performed, the present invention is not limited to this. Both of the processes may be simultaneously performed.

In step S510, the message transmission unit 206 transmits a message to the designated device, and control proceeds to step S511. For example, when it is determined that a message is to be transmitted to the camera 101, the message is transmitted to "kensuke@xxx.co.jp/camera".

In step S511, the message transmission unit 206 notifies the smartphone 102, which is another device of the user A, that a message has been transmitted to the camera 101, and the process is ended. The notification message is transmitted to a destination "kensuke@xxx.co.jp/smartphone" using information indicating a relationship between the user A and the device, which is stored in the device management unit 202. A message which notifies that a message has been transmitted to the camera 101 may also be transmitted to a device (the camera 103, the printer 104) of the user B, who is the sender (source). The information processing apparatus 106 may transmit the message to the user B's device directly or via the information processing apparatus 107. Instead of the user B's device, the user B may be notified (a notification directed to "naoki@yyy.co.jp").

In step S512, the message transmission unit 206 temporarily stores a message until the device selected in step S507 has become ready to use and the message has been transmitted to the device ready to use, and the process is ended.

Although, in this embodiment, a message is stored in steps S506 and S512, the present invention is not limited to this. Alternatively, after a device has been notified, a message may be stored only when a device which has transmitted the message gives a permission, and may be discarded otherwise.

Figure 6:
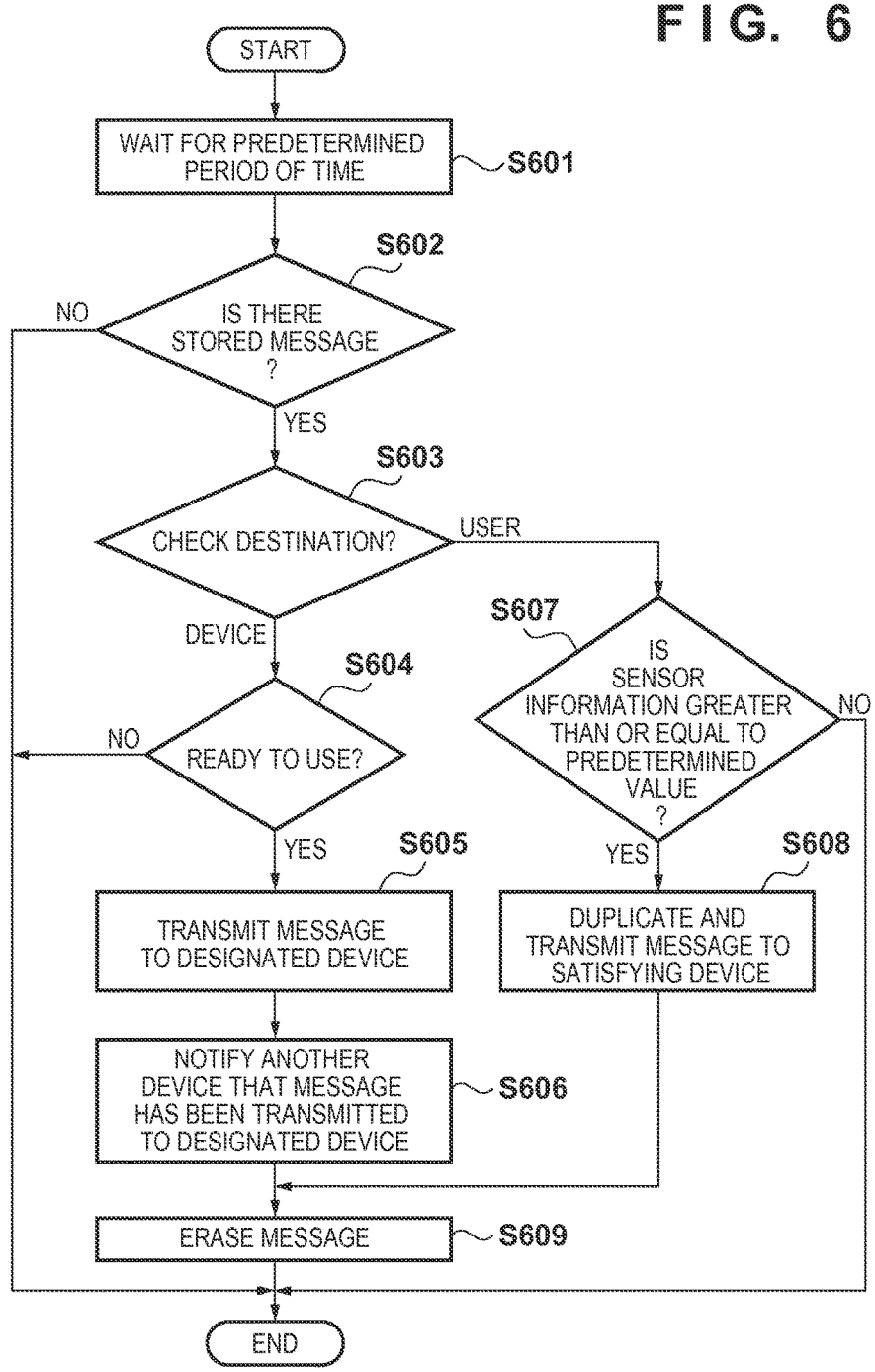
FIG. 6 is a flowchart showing steps of a process which is performed at predetermined intervals by the information processing apparatus 106 of the embodiment of the present invention.

FIG. 6 is a flowchart showing steps of a process which is performed at predetermined intervals by the information processing apparatus 106 of the embodiment of the present invention.

In step S601, the message transmission unit 206 waits for a predetermined period of time, and thereafter, control proceeds to step S602. In step S602, the message transmission unit 206 determines whether or not there is any stored message. The message transmission unit 206 determines whether or not any message is stored in a memory (not shown). If the message transmission unit 206 determines that there is a stored message, control proceeds to step S603. On the other hand, if the message transmission unit 206 determines that there is not a stored message, the process is ended. In this embodiment, a message may be stored in steps S506 and S512.

In step S603, the determination unit 207 determines whether a message is directed to the user A or a device (the camera 101 or the smartphone 102), based on the destination address of the message. If it is determined that the message is directed to the user A, control proceeds to step S607. On the other hand, if it is determined that the message is directed to a device, control proceeds to step S604. Step S603 is similar to step S502.

In step S604, the selection unit 203 determines, based on the sensor information of a device designated as a destination, whether or not the device is currently ready to use. If the result of the determination is positive, control proceeds to step S605. Otherwise, the process is ended. Step S604 is similar to step S509.

In step S605, the message transmission unit 206 transmits a message to the designated device (e.g., the camera 101), and control proceeds to step S606 (similar to step S510). In step S606, the message transmission unit 206 notifies the smartphone 102, which is another device of the user A, that a message has been transmitted to the camera 101, and control proceeds to step S609 (similar to step S511).

In step S607, the selection unit 203 obtains the sensor information of a corresponding device(s) from the device management unit 202, and determines whether or not the sensor information is greater than or equal to a predetermined value. If it is determined that there is at least one device whose sensor information is greater than or equal to the predetermined value, the selection unit 203 selects the device, and control proceeds to step S608. If sensor information is received from a device during the waiting period of time in step S601, the sensor information is updated in step S402. If, as a result, the resultant sensor information is greater than or equal to the predetermined value, the result of the determination in step S607 is positive, and control proceeds to step S608. On the other hand, if it is determined that there is no device whose sensor information is greater than or equal to the predetermined value, control proceeds to step S609. Step S607 is similar to step S504.

In step S608, if there are multiple devices whose sensor information is greater than or equal to the predetermined value, the message transmission unit 206 duplicates a message, and thereafter, transmits the message to all devices selected by the selection unit 203, and control proceeds to step S609 (similar to step S505). In step S609, the message transmission unit 206 erases the message which has been transmitted, and the process is ended.

Thus, by temporarily storing a message, the risk that a message could not be delivered due to a situation or condition of a device, can be reduced. As a result, a user who possesses a device does not have to avoid using the device during a predetermined period of time in order to receive a message which might arrive, resulting in an improvement in usability.

FIG. 7 is a sequence diagram of an information processing system according to an embodiment of the present invention.

The information processing apparatus 106 determines the update frequency of sensor information received from the camera 101 and the smartphone 102 based on the data amount of the sensor information, the bandwidth of the network 100, and the processing rate of the information processing apparatus 106. A method for calculating the update frequency will be described below.

In M701, the information processing apparatus 106 notifies the camera 101 of the determined update frequency via the XMPP server 105. Similarly, in M702, the information processing apparatus 106 notifies the smartphone 102 of the determined update frequency via the XMPP server 105.

In M703, the camera 101 notifies the information processing apparatus 106 of sensor information at intervals corresponding to the designated update frequency via the XMPP server 105. Similarly, in M704, the smartphone 102 notifies the information processing apparatus 106 of sensor information at intervals corresponding to the designated update frequency via the XMPP server 105.

The update frequency is the maximum update frequency, and the update frequency may be determined based on the situation or condition of the device in a range smaller than the transmitted value. If no change occurs in the sensor information, the information processing apparatus 106 may not be notified of the sensor information. Although, in this embodiment, a device is a sender (source) in M703 and M704, the present invention is not limited to this. Alternatively, the information processing apparatus 106 may regularly fetch sensor information. When an external sensor (e.g., a built-in temperature sensor) is used, the information processing apparatus 106 may be notified of sensor information from the external sensor at the same update frequency as that described above.

In M705, the information processing apparatus 106 stores sensor information received from the camera 101 and the smartphone 102. The information processing apparatus 106 selects a device to which a higher priority should be given, from the user A's devices (the camera 101, the smartphone 102), based on the sensor information of the devices.

In M706, the camera 103 transmits a message directed to the user A, to the information processing apparatus 107, via the XMPP server 105. In M707, the information processing apparatus 107 transmits a message directed to the user A, to the information processing apparatus 106, via the XMPP server 105.

In M708, the information processing apparatus 106 analyzes the matter of the message. The information processing apparatus 106 determines that the message is directed to the user A and the matter of the message is copying (operation) of a file. The information processing apparatus 106 compares the sensor information of devices associated with the user A to select the camera 101 from the devices.

In M709, the information processing apparatus 106 determines whether or not the camera 101 is ready to use. If the result of the determination is negative, the information processing apparatus 106 stores the received message. The information processing apparatus 106 performs this determination at predetermined intervals.

In M710, the information processing apparatus 106 transmits a message to the camera 101 which has been determined to be ready to use. In M711, the information processing apparatus 106 notifies the smartphone 102 that a message has been transmitted to the camera 101. In M712, the information processing apparatus 106 notifies the information processing apparatus 107, via the XMPP server 105, that a message has been transmitted to the camera 101. At this time, the notification may be directed to the user B or the camera 103, which is the sender (source). In this embodiment, the notification is transmitted to the user B. In M713, the information processing apparatus 107 notifies the camera 103, via the XMPP server 105, that a message has been transmitted.

Figure 8A:
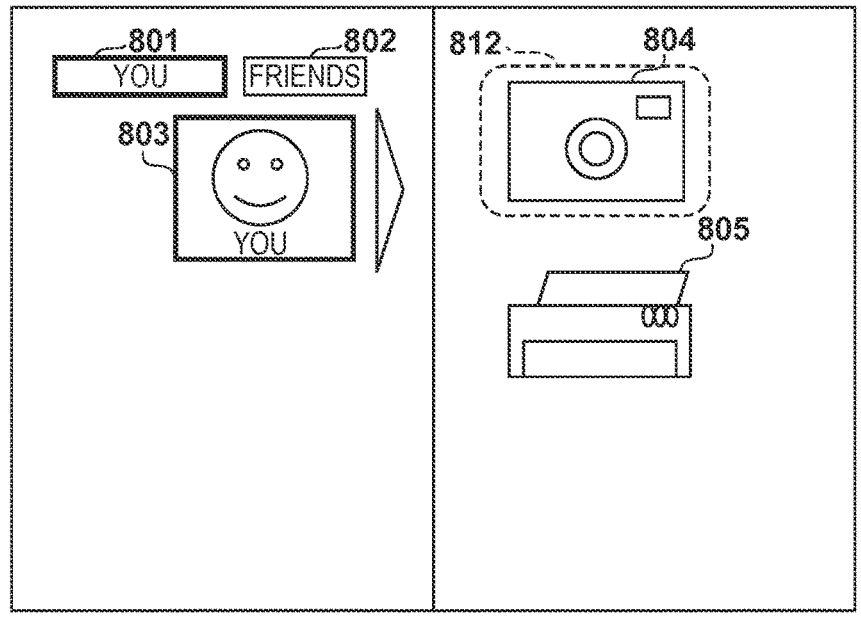
FIGS. 8A and 8B are diagrams showing an example user interface of the camera 103 of the embodiment of the present invention.
Figure 8B:
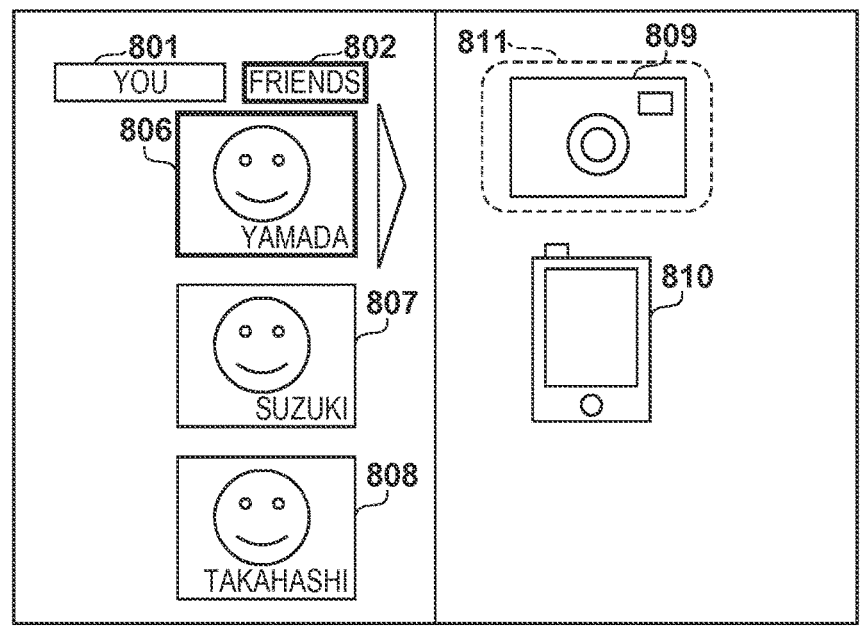

FIGS. 8A and 8B are diagrams showing an example user interface of the camera 103 of the embodiment of the present invention. FIG. 8A shows a device possessed by the user B as viewed from the user B themselves. A reference character 801 indicates a tag for displaying the user's own devices. In the example of FIG. 8A, the tag 801 is selected. A reference character 802 indicates a tag for displaying a list of friends and a friend's devices.

A reference character 803 indicates an icon representing the user of the device. The headshot photograph or avatar etc. of the user of the device is displayed. By performing a long tap on the icon, a list of sensor information of devices possessed by the user of the device can be seen in another window. A list of commands which can be executed by the device of the user can also be displayed based on the sensor information. Although, in this embodiment, the sensor information list and the command list are displayed, the present invention is not limited to this.

A reference character 804 indicates an icon representing the camera 103. By performing a long tap on this icon, the sensor information of the camera 103 is obtained. A window for transmitting a message to the camera 103 may also be displayed. In the window, a message may be created, and thereafter, may be transmitted to the camera 103. At this time, the destination in XMPP is "naoki@yyy.co.jp/camera". In this example, a message may also be transmitted from the camera 103 to the camera 103.

A reference character 805 indicates an icon representing the printer 104. By performing a long tap on this icon, the sensor information of the printer 104 is obtained. A message may also be transmitted to the printer 104. At this time, the destination in XMPP is "naoki@yyy.co.jp/printer".

A reference character 812 indicates a mark which is attached to one selected from the user B's devices. In this embodiment, as a result of comparison of sensor information, the camera 103 is selected. When the user B operates the printer 104, the information processing apparatus 107 determines, based on updating of the sensor information of the printer 104, that the printer 104 is currently being used, and attaches the mark 812 to the icon 805. Thus, when the sensor information is updated, the mark 812 moves. The user can know, from the mark 812, which device has been selected by the information processing apparatus 107, and use the device with assurance. Moreover, when a device intended by the user has not been selected, the information processing apparatus 107 may be notified of the intended device using a user interface (double clicking of an icon, etc.), sound, etc. The information processing apparatus 107 accumulates and uses such notifications to select a device in the future. Highly accurate selection can be performed, resulting in an improvement in convenience.

FIG. 8B shows a list of the user B's friends and a friend's devices. Here, a difference between FIGS. 8A and 8B will be described in detail. In the example of FIG. 8B, a tag 802 for friends has been selected.

A reference character 806 indicates an icon representing the user A. The headshot photograph or avatar etc. of the user A is displayed. Here, a name (Yamada) is displayed as additional information over the icon. If the icon of the user A (Yamada) is clicked, the user A is selected, and the frame of the icon 806 is thickened. By performing a long tap on the icon 806, a list of sensor information of devices possessed by the user A may be seen in another window. Moreover, a message may be transmitted to the user A. At this time, the user A's destination in XMPP is "kensuke@xxx.co.jp".

A reference character 807 indicates an icon representing a user C. The headshot photograph or avatar etc. of the user C is displayed. A reference character 808 indicates an icon representing a user D. The headshot photograph or avatar etc. of the user D is displayed.

A reference character 809 indicates an icon representing the user A's camera 101. By performing a long tap on the icon 809, the sensor information of the camera 101 may be seen. Moreover, a message may be transmitted to the camera 101. At this time, the destination in XMPP is "kensuke@xxx.co.jp/camera".

A reference character 810 indicates an icon representing the user A's smartphone 102. By performing a long tap on the icon 810, the sensor information of the smartphone 102 may be seen. Moreover, a message may be transmitted to the smartphone 102. At this time, the destination in XMPP is "kensuke@xxx.co.jp/smartphone".

A reference character 811 indicates a mark which is attached to one selected from the user A's devices. In this embodiment, as a result of comparison of sensor information, the camera 101 is selected. When the user A operates the smartphone 102, the information processing apparatus 106 determines, based on updating of the sensor information of the smartphone 102, that the smartphone 102 is currently being used, and attaches the mark 811 to the icon 810. Thus, when the sensor information is updated, the mark 811 moves. The user B can previously know, from the mark 811, which device has been selected by the information processing apparatus 106. Although, in this embodiment, a mark is shown, the present invention is not limited to this. Alternatively, other representations may be provided, such as that a new icon is provided, that icons are changed, that another visual representation is provided, that reading aloud is performed, etc.

Thus, the user can be notified of a selected device or a device currently ready to use, by displaying on a user interface or via an audio output unit (not shown), using at least one of a name, color, mark, or sound corresponding to the device.

Although, in this embodiment, the user interface is, for example, provided in the camera 103, the user interface may be provided in other devices, particularly in the information processing apparatus 106.

As described above, when a message is directed to a user, a device is selected based on sensor information of devices, and the message is transmitted to the selected device.

According to this embodiment, a message can be delivered to a device intended by a user. As a result, if a user possesses multiple devices, then when the user only uses any device, a message is delivered to the device which is currently being used by the user, resulting in an increase in convenience. Moreover, a user may transmit a message to another user on the other end instead of the other user's device. Time and effort to set a network environment etc. for the other user's device can be removed, resulting in an improvement in usability.

A second embodiment will now be described with reference to the attached drawings, particularly indicating a difference between the first and second embodiments. In this embodiment, a destination process for a message which is performed when the message is received by the information processing apparatus 106 and the information processing apparatus 107, will be described in detail.

FIG. 11 is a sequence diagram showing a case where the user B transmits contents from the camera 103 to the user A according to an embodiment of the present invention. Reference characters 1001 to 1006 of FIG. 10 are related to FIG. 11 and indicate changing of destinations.

In M1101, the camera 103 transmits a message to the information processing apparatus 107 via the XMPP server 105. The reference character 1001 of FIG. 10 indicates the destination and source of a packet at this time. The field "to(hop-by-hop)" indicates a destination in XMPP, i.e., "naoki@yyy.co.jp/virtual". The field "from(hop-by-hop)" indicates a source in XMPP, i.e., "naoki@yyy.co.jp/camera". The expression "naoki@yyy.co.jp/virtual" indicates the information processing apparatus 107. The field "to (inner-header)" indicates a destination included in a header of this embodiment included in the payload area of XMPP. The field "from(inner-header)" indicates a source included in the header of this embodiment included in the payload area of XMPP. Although the fields "to(inner-header)" and "from(inner-header)" include a destination in the XMPP format, the present invention is not limited to this. Alternatively, the fields "to(inner-header)" and "from(inner-header)" may include a name. In this case, a function of converting a name into an address in the XMPP format may be provided in the system.

In M1102, the information processing apparatus 107 checks the matter of the received message, and rewrites the header from the format of 1001 into the format of 1002 of FIG. 10. Because the field "to(inner-header)" of 1001 of FIG. 10 is "kensuke@xxx.co.jp" indicating the user A, the field "to(hop-by-hop)" of 1002 of FIG. 10 is rewritten with "kensuke@xxx.co.jp/virtual" in order to transmit the message to the information processing apparatus 106 of the user A. Because the message is transmitted from the information processing apparatus 107 of the user B, the field "from(hop-by-hop)" is rewritten with "naoki@yyy.co.jp/virtual", which is the JID in XMPP of the information processing apparatus 107. Next, the field "to(inner-header)" is the user A as a destination, and therefore, is not changed. The field "from (inner-header)" is "naoki@yyy.co.jp/camera", which is the source of the message, and therefore, is not changed.

Although, in this embodiment, the field "from(inner-header)" indicates a device itself, the present invention is not limited to this. Alternatively, the field "from(inner-header)" may be rewritten with "naoki@yyy.co.jp" to indicate the user B themselves. When the field "from(inner-header)" is not rewritten and still indicates a device, there is an advantage that a message can be returned to a device which has transmitted the message. When the field "from(inner-header)" is rewritten with a user, there is an advantage that an information processing apparatus can select a suitable one from devices possessed by a user when a message is returned.

In M1103, the information processing apparatus 107 transmits the message which has been rewritten into the format of 1002 of FIG. 10 to the information processing apparatus 106 via the XMPP server 105. In M1104, the information processing apparatus 106 checks the matter of the received message, and rewrites the header from the format of 1002 of FIG. 10 into the format of 1003 of FIG. 10. Because the information processing apparatus 106 selects a suitable one from the devices possessed by the user A, and transmits the message to the selected device (the process of FIG. 5), the field "to(hop-by-hop)" is rewritten with "kensuke@xxx.co.jp/camera". Because the message is transmitted from the information processing apparatus 106, the field "from(hop-by-hop)" is rewritten with "kensuke@xxx.co.jp/virtual", which is the JID in XMPP of the information processing apparatus 106. Next, the field "to(inner-header)" is the user A as a destination, and therefore, is not changed. The field "from(inner-header)" is "naoki@yyy.co.jp/camera", which is the source of the message, and therefore, is not changed.

In M1105, the information processing apparatus 106 transmits the message which has been rewritten into the format of 1003 of FIG. 10 to the camera 101 via the XMPP server 105. In M1106, the camera 101 receives the message, and stores contents contained in the message to the camera 101, depending on the matter of the message.

The camera 101 transmits to the camera 103 a response message indicating that contents have been received. In this embodiment, the field "from(inner-header)" indicates a device (camera), and therefore, the device (camera) is designated as a transmission destination of a response. When the field "from(inner-header)" indicates a user, a process similar to that of 1001 to 1003 of FIG. 10 (different in that the user A and the user B are interchanged) is performed. The camera 101 generates, from the destination of 1003 of FIG. 10, a packet for a response to the destination of 1004 of FIG. 10. The expression "kensuke@xxx.co.jp/virtual", which is the destination of the information processing apparatus 106 of the user A, is written to the field "to(hop-by-hop)". The JID of the camera 101 is written to the field "from(hop-by-hop)". The expression "naoki@yyy.co.jp/camera", which is the destination of the camera 103 of the user B, is written to the field "to(inner-header)". The expression "kensuke@xxx.co.jp/camera", which is the destination of the camera 101 of the user A, is written to the field "from(inner-header)".

In M1107, the camera 101 transmits the message in the format of 1004 of FIG. 10 to the information processing apparatus 106 via the XMPP server 105. In M1108, the information processing apparatus 106 checks the matter of the received message, and rewrites the header from the format of 1004 of FIG. 10 into the format of 1005 of FIG. 10. The information processing apparatus 106 extracts the user B's destination from the field "to(inner-header)" of the message of 1004 of FIG. 10. The field "to(hop-by-hop)" is rewritten with a destination ("naoki@yyy.co.jp/virtual") which is obtained by adding resource information (virtual) indicating an information processing apparatus to the extracted destination. Because the message is transmitted from the information processing apparatus 106, the field "from(hop-by-hop)" is rewritten with "kensuke@xxx.co.jp/virtual", which is the JID in XMPP of the information processing apparatus 106. Next, the field "to(inner-header)" is the camera 103 of the user B as a destination, and therefore, is not changed. The field "from(inner-header)" is "kensuke@xxx.co.jp/camera", which is the source of the message, and therefore, is not changed. Although, in this embodiment, a device is a source, the present invention is not limited to this. The user A may be a source (kensuke@xxx.co.jp).

In M1109, the information processing apparatus 106 transmits the message in the format of 1005 of FIG. 10 to the information processing apparatus 107 via the XMPP server 105. In M1110, the information processing apparatus 107 checks the matter of the received message, and rewrites the header from the format of 1005 of FIG. 10 into the format of 1006 of FIG. 10. The information processing apparatus 107 determines, based on the field "to(inner-header)", that the JID (naoki@yyy.co.jp/camera) of the camera 103 of the user B is designated. Because the JID of the camera 103 is designated, the information processing apparatus 107 goes to the mode in which a message is transmitted to a device having this JID. The information processing apparatus 107 rewrites the field "to(hop-by-hop)" with the camera 103's destination (naoki@yyy.co.jp/camera). Because the message is transmitted from the information processing apparatus 107, the field "from(hop-by-hop)" is rewritten with "naoki@yyy.co.jp/virtual", which is the JID in XMPP of the information processing apparatus 107. Next, the field "to(inner-header)" is the camera 103 of the user B as a destination, and therefore, is not changed. The field "from(inner-header)" is "kensuke@xxx.co.jp/camera", which is the source of the message, and therefore, is not changed. In M1111, the information processing apparatus 107 transmits the message in the format of 1006 of FIG. 10 to the camera 103 via the XMPP server 105.

Note that, when a device is designated for communication, the process is performed based on 1004 to 1006 of FIG. 10. When a response is transmitted back, the destinations and sources of 1004 to 1006 of FIG. 10 are only replaced with devices and information processing apparatuses corresponding to users, and therefore, transmission of a response will not be described.

Figure 12A:
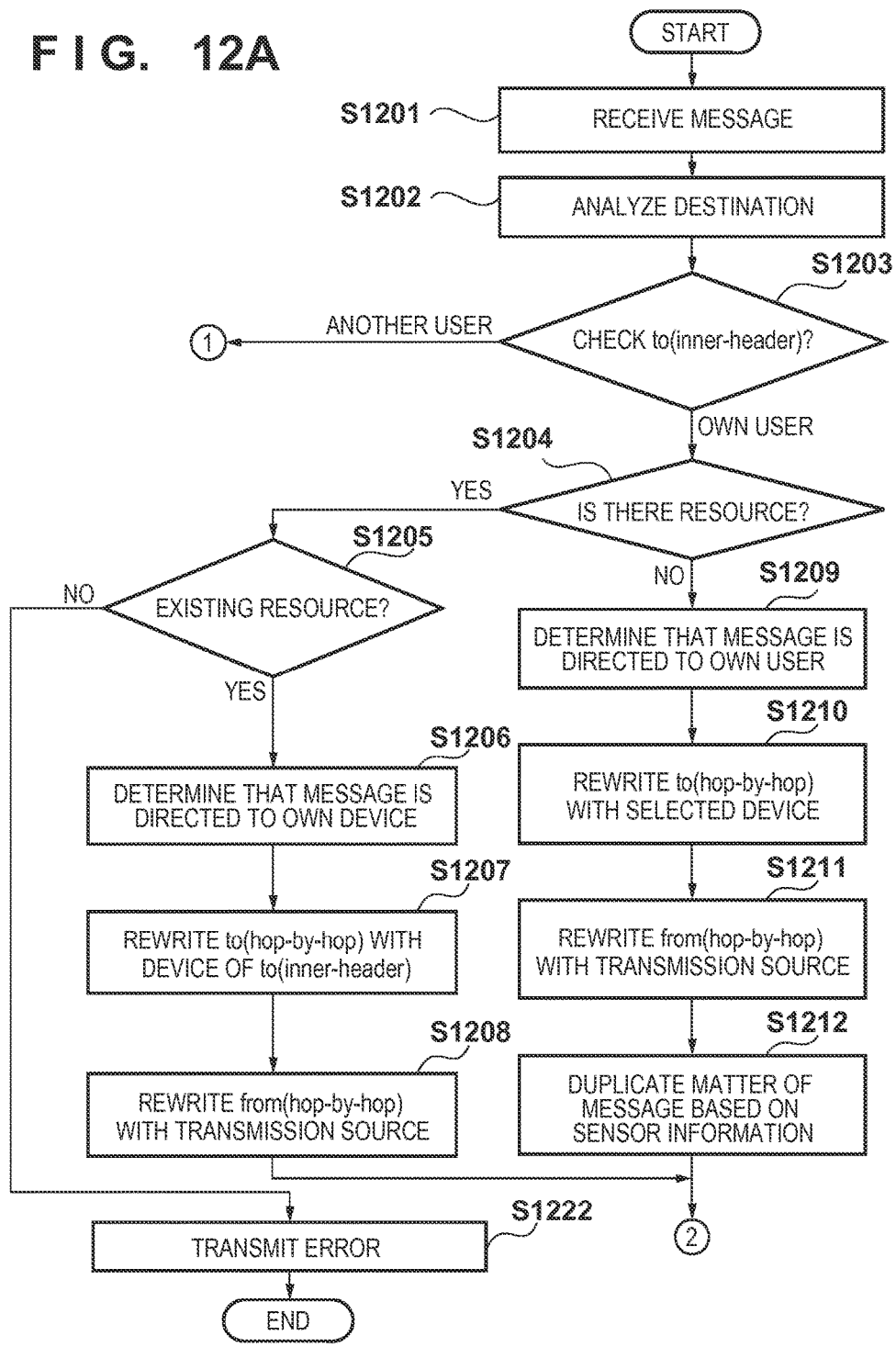
FIGS. 12A and 12B are flowcharts showing steps of a process which is performed when the information processing apparatus 106 of the embodiment of the present invention receives a message.
Figure 12B:
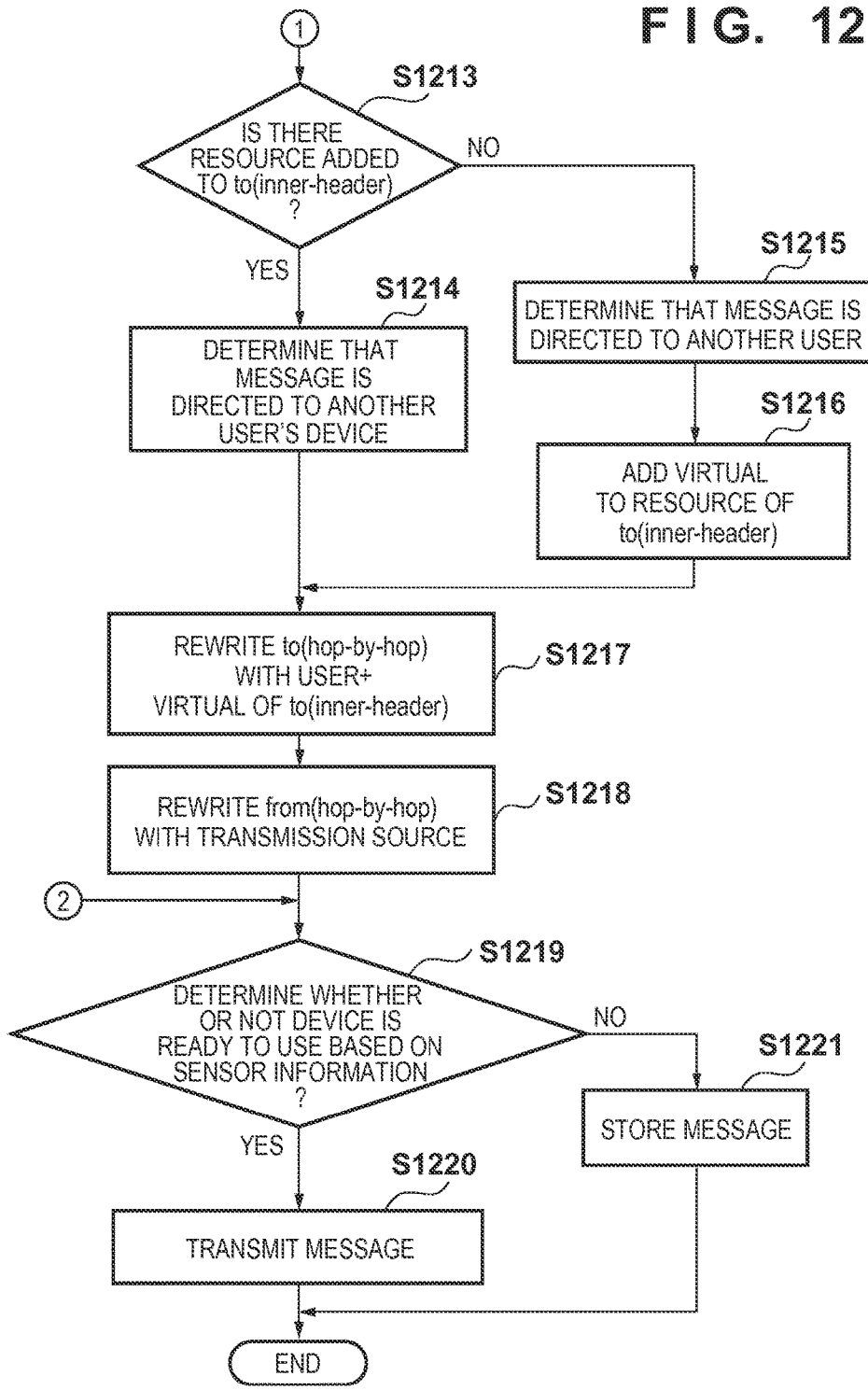

Next, FIGS. 12A and 12B are flowcharts showing steps of a process which is performed when the information processing apparatus 106 of the embodiment of the present invention receives a message. Here, a difference between the flowcharts of FIGS. 5 and 12A-12B will be mainly described.

In step S1201, the message reception unit 205 receives a message (first message) of 1002 of FIG. 10, and control proceeds to step S1202. In step S1202, the determination unit 207 analyzes destinations contained in the message, and control proceeds to step S1203. Here, the destinations are destinations in XMPP shown in 1002 of FIG. 10 (a first transmission destination in the field "to(hop-by-hop)" indicating the address of an information processing apparatus, and a first transmission source in the field "from(hop-by-hop)" which transmits a message to an information processing apparatus), and protocol destinations (a second transmission destination in the field "to(inner-header)" indicating a final destination, and a second transmission source in the field "from(inner-header)" which transmits a message first).

In step S1203, the determination unit 207 determines whether the destination in the field "to(inner-header)" is its own user (the user A as a destination) or another user (e.g., the user B as a destination other than the user A as a destination). Specifically, based on the second transmission destination in the field "to(inner-header)", it is determined whether the message is directed to the own user related to the information processing apparatus 106 or another user. The determination unit 207 can perform the determination using information about the destination addresses of users and devices managed by the device management unit 202. If it is determined that the destination in the field "to(inner-header)" is the own user, control proceeds to step S1204. On the other hand, if it is determined that the destination in the field "to(inner-header)" is another user, control proceeds to step S1205 in which a process corresponding to M1102 performed by the information processing apparatus 107 is performed.

In step S1204, the determination unit 207 determines whether or not resource information is added to the destination in the field "to(inner-header)". Here, the resource information is an identifier (a smartphone, a camera, etc.) indicating a device. Note that when an identifier indicating the information processing apparatus 106 (in this embodiment, "virtual") is added, the process is performed, assuming that there is not resource information. If it is determined that resource information is added to the destination in the field "to(inner-header)", control proceeds to step S1205 in which a process corresponding to M1110 performed by the information processing apparatus 107 is performed. On the other hand, if it is determined that resource information is not added to the destination in the field "to(inner-header)", control proceeds to step S1209 in which a process corresponding to M1104 is performed.

In step S1205, the device management unit 202 determines whether or not a device corresponding to the resource information is associated with the user A. If the result of the determination is positive (the user A possesses the designated device), control proceeds to step S1206. Otherwise (the user A does not possess the designated device), control proceeds to step S1222.

In step S1206, the determination unit 207 determines that the message is directed to its own user's device, and control proceeds to step S1207. In step S1207, the message transmission unit 206 rewrites the field "to(hop-by-hop)" with a resource (device) designated in the field "to(inner-header)", and control proceeds to step S1208. Although, in this embodiment, the destination of a message is rewritten, the present invention is not limited to this. Alternatively, a new message may be generated. Although the message transmission unit generates and rewrites a message, the present invention is not limited to this. Alternatively, a message generation unit may be additionally provided in the information processing apparatus 106.

In step S1208, the message transmission unit 206 rewrites the field "from(hop-by-hop)" with a transmission source ("kensuke@xxx.co.jp/virtual"), and control proceeds to step S1219.

On the other hand, in step S1209, the determination unit 207 determines that the message is directed to its own user, and control proceeds to step S1210.

In step S1210, the selection unit 203 selects a suitable one from devices associated with the user A, based on sensor information. Thereafter, the message transmission unit 206 rewrites the field "to(hop-by-hop)" with the selected device's destination, and control proceeds to step S1211. In step S1211, the message transmission unit 206 rewrites the field "from(hop-by-hop)" with a transmission source ("kensuke@xxx.co.jp/virtual"), and control proceeds to step S1212.

In step S1212, the determination unit 207 duplicates the message based on the matter of the message and the sensor information, and control proceeds to step S1219. Step S1212 and the following steps are similar to those which are performed when it is determined in step S502 of FIG. 5 that a message is directed to a user.

In step S1213, the determination unit 207 determines whether or not resource information (a smartphone, a camera, etc.) is added to the field "to(inner-header)" (whether the field "to(inner-header)" designates a user or a device). If the result of the determination is positive, control proceeds to step S1214 in which a process corresponding to M1108 is performed. Otherwise, control proceeds to step S1215 in which a process corresponding to M1102 performed by the information processing apparatus 107 is performed.

In step S1214, the determination unit 207 determines that the message is directed to another user's device, and control proceeds to step S1217.

On the other hand, in step S1215, the determination unit 207 determines that the message is directed to another user, and control proceeds to step S1216. In step S1216, the message transmission unit 206 adds, to the field "to(inner-header)", "virtual" (second resource information) which is the resource information of the information processing apparatus 107, and control proceeds to step S1217. Although, in this embodiment, the resource information of the information processing apparatus 107 is previously determined, the present invention is not limited to this. Alternatively, in order to obtain a resource name, a query may be transmitted to a server on the network 100.

In step S1217, the message transmission unit 206 extracts the user portion (naoki@yyy.co.jp excluding the resource information portion) from the field "to(inner-header)". The message transmission unit 206 concatenates "naoki@yyy.co.jp" with "virtual" (second resource information) which is the resource information of the information processing apparatus 107 to generate "naoki@yyy.co.jp/virtual". Thereafter, the message transmission unit 206 rewrites the field "to(hop-by-hop)" with "naoki@yyy.co.jp/virtual", and control proceeds to step S1218. In step S1218, the message transmission unit 206 rewrites the field "from (hop-by-hop)" with a transmission source ("kensuke@xxx.co.jp/virtual"), and control proceeds to step S1219.

In step S1219, the determination unit 207 determines whether or not the device is ready to use, based on sensor information managed by the device management unit 202 (corresponding to step S509 and the following steps of FIG. 5). If the result of the determination is positive, control proceeds to step S1220. Otherwise, control proceeds to step S1221.

In step S1220, the message transmission unit 206 transmits a message via the XMPP server 105, and the process is ended. On the other hand, in step S1221, the message transmission unit 206 temporarily stores the message, and the process is ended. The message temporarily stored by the process of FIGS. 12A-12B is regularly checked, and if the message is ready to be transmitted, the message is transmitted.

In step S1222, the message transmission unit 206 transmits information indicating that an error occurs to the destination in the field "from(inner-header)" of the message. If the message is from another user, an error message is also transmitted to an information processing apparatus. The error message may be transmitted directly to another user's device, or alternatively, as shown in FIG. 11, by communication via an information processing apparatus, using a reverse path from a place where an error occurs.

Although, in this embodiment, a single destination is selected for a message, the present invention is not limited to this. As described in the first embodiment, a message may be duplicated, depending on the matter of the message, and output to multiple destinations.

Although, in this embodiment, XMPP is used, the present invention is not limited to this. Alternatively, another protocol for delivering a message may be used. Alternatively, a combination of another protocol for delivering a message and still another protocol in the payload may be used.

As described above, an information processing apparatus according to this embodiment, when receiving a message, determines whether the message is directed to a user or a device, based on the second destination contained in the matter of the message. The first destination is rewritten based on the second destination or the user information, and thereafter, the message is transmitted.

According to this embodiment, by rewriting a destination, a message can be smoothly delivered. As a result, a user and a device can be controlled together, and therefore, communication can be performed without knowledge of the location of the user, resulting in an improvement in usability in situations that multiple devices are used.

In a third embodiment, a process for a printer (not shown) or a television or monitor (not shown) in a public area will be described. For example, when the user A stands at a printer in a public area of an office, the printer detects the user A using a motion sensor, and recognizes the user A based on an image captured by a nearby monitoring camera (not shown). The user A is previously registered in their company's security system, and therefore, the user A can be identified using the monitoring camera. Although, here, a user is identified using an image captured by a monitoring camera, the present invention is not limited to this. A user may be identified using other techniques, such as authentication using a wireless tag, etc. The user A may be temporarily associated with the printer provided in the public area of the office.

The device management unit 202 obtains a destination address related to the printer from the security system. Thereafter, the device management unit 202 registers the destination address ("system@zzz.co.jp/printer") of the printer, and a destination address ("kensuke@xxx.co.jp/printer") in the information processing apparatus 106 of the user A ("kensuke@xxx.co.jp") in association with each other.

The information processing apparatus 106 transfers a message directed to the device of "kensuke@xxx.co.jp/printer" to "system@zzz.co.jp/printer", and therefore, is allowed to temporarily use the printer. Also, when a message (printing) directed to the user A is received, the user A's printer is selected, and printing is started. Thus, the user A can easily use a device provided in a public area. For example, when the user A receives a message (printing), then if the user A does not have a printer, an indication that the message (printing) has been received is displayed on the camera 101. If the user A only comes close to the printer provided in the public area, the user A is allowed to execute printing. At this time, the user A may be authenticated by carrying and putting the camera 101 close to the printer.

When the user A moves away from the printer, the user A's disappearance from the image capture range or field of view of the monitoring camera (not shown) is detected, and a linkage between the user A and the printer is cancelled. The linkage may be semi-permanently maintained once it has been established. Alternatively, as in this embodiment, the linkage may be cancelled when a predetermined event occurs. After the cancellation, the linkage may remain as a log, which may be displayed as a device of FIGS. 8A and 8B. At this time, this device is displayed in a manner different from those for other devices which are invariably associated (e.g., this device is grayed out), to allow the user to understand the situation.

A similar process may be performed on a television, a monitor, and a projector. In this case, when the user A comes close to the device, this may be detected and a message (image) may be displayed.

Although, in this embodiment, a printer and an information processing apparatus convert destination addresses, the present invention is not limited to this. Alternatively, a printer may generate a session of "kensuke@xxx.co.jp/printer". As a result, the destination address conversion process in the information processing apparatus 106 can be reduced.

Although, herein, the linkage between the user A and various devices is established based on the physical proximity therebetween, the present invention is not limited to this. Alternatively, the linkage may be established by the user A's device operation.

Thus, a number of people can easily use devices which are provided in public areas (e.g., a shared area in an office, a waiting area in a public facility, a hospital, a convenience store, etc.), resulting in an improvement in convenience.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-126127, filed Jun. 14, 2013, which is hereby incorporated by reference herein in its entirety.

What is claimed is:

1. A control apparatus comprising:
   a reception unit configured to receive a message via a network;
   an obtainment unit configured to obtain a result of detection by a sensor for detecting at least one of (a) a state of a device and (b) a state of an environment around a device;
   a selection unit configured to select, based on the result of detection obtained by the obtainment unit, from a plurality of devices corresponding to a common address set as a destination of the message received by the reception unit, a device to which the received message is to be transmitted;
   a setting unit configured to change a destination address of the received message from the common address corresponding to the plurality of devices to an address specific to the device selected by the selection unit based on the result of detection; and
   a transmission unit configured to transmit the message whose destination address is changed by the setting unit.

2. The control apparatus according to claim 1, further comprising:
   a management unit configured to manage results of detection by a plurality of sensors for respectively detecting states of the plurality of devices corresponding to the common address,
   wherein the selection unit selects the device to which the received message is to be transmitted, based on the results of detection managed by the management unit.

3. The control apparatus according to claim 1, wherein the selection unit selects a device being used by a user as the device to which the received message is to be transmitted, based on the result of detection obtained by the obtainment unit.

4. The control apparatus according to claim 1, further comprising:
a notification unit configured to notify a device corresponding to the common address, other than the device selected by the selection unit, that the received message is transmitted to the selected device by the transmission unit.

5. The control apparatus according to claim 1, wherein the obtainment unit obtains a result of detection by at least one of a touch sensor, a gyroscope, and an angle sensor for detecting a state of a device.

6. The control apparatus according to claim 1, wherein the obtainment unit obtains a result of detection by at least one of an optical sensor, a pressure sensor, an image sensor, a sound sensor, a magnetometer, an object recognition sensor, a motion sensor, and a illuminance sensor for detecting a state of an environment around a device.

7. The control apparatus according to claim 1, wherein the obtainment unit obtains a result of detection by a sensor for detecting a state of a device, at intervals corresponding to the state of the device.

8. The control apparatus according to claim 1, wherein the obtainment unit obtains, as the result of detection, information indicating at least one of a state of a CPU of a device, a state of a memory of a device, a state of a network connected with a device, and a state of application used by a device.

9. The control apparatus according to claim 1, further comprising:
a determination unit configured to determine whether a destination address set for the message received by the reception unit is a common address corresponding to a plurality of devices, or the destination address is an address specific to one device,
wherein the transmission unit transmits the received message whose destination address is not changed by the setting unit, in a case where the determination unit determines that the destination address set for the received message is an address specific to one device.

10. The control apparatus according to claim 1, further comprising:
a display control unit configured to display an image indicating the device selected by the selection unit.

11. The control apparatus according to claim 10, wherein the display control unit displays, in response to touch on a displayed image of a device, an image indicating a result of detection for the device obtained by the obtainment unit.

12. A method for selecting a destination of data using a control apparatus, the method comprising:
receiving a message via a network;
obtaining a result of detection by a sensor for detecting at least one of (a) a state of a device and (b) a state of an environment around a device;
selecting, based on the result of detection obtained in the obtaining, from a plurality of devices corresponding to a common address set as a destination of the message received in the receiving, a device to which the received message is to be transmitted;
changing a destination address of the received message from the common address corresponding to the plurality of devices to an address specific to the device selected in the selecting based on the result of detection; and
transmitting the message whose destination address is changed in the changing.

13. The method according to claim 12, further comprising:
managing results of detection by a plurality of sensors for respectively detecting states of the plurality of devices corresponding to the common address,
wherein in the selecting, the device is selected to which the received message is to be transmitted, based on the managed results of detection.

14. The method according to claim 12, wherein in the selecting, a device being used by a user is selected as the device to which the received message is to be transmitted, based on the result of detection obtained in the obtaining.

15. A non-transitory storage medium storing a computer program, the computer program causing a computer to execute steps comprising:
receiving a message via a network;
obtaining a result of detection by a sensor for detecting at least one of (a) a state of a device and (b) a state of an environment around a device;
selecting, based on the result of detection obtained in the obtaining, from a plurality of devices corresponding to a common address set as a destination of the message received in the receiving, a device to which the received message is to be transmitted;
changing a destination address of the received message from the common address corresponding to the plurality of devices to an address specific to the device selected in the selecting based on the result of detection; and
transmitting the message whose destination address is changed in the changing.

16. The non-transitory storage medium according to claim 15, wherein the computer program causes the computer to further execute:
managing results of detection by a plurality of sensors for respectively detecting states of the plurality of devices corresponding to the common address,
wherein in the selecting, the device is selected to which the received message is to be transmitted, based on the managed results of detection.

17. The non-transitory storage medium according to claim 15, wherein in the selecting, a device being used by a user is selected as the device to which the received message is to be transmitted, based on the result of detection obtained in the obtaining.

* * * * *